(12) United States Patent
Mizuno et al.

(10) Patent No.: US 6,426,800 B1
(45) Date of Patent: *Jul. 30, 2002

(54) DIGITAL IMAGE-FORMING APPARATUS

(75) Inventors: Kouji Mizuno, Ikoma; Syoichiro Yoshiura, Tenri; Yasuhiro Nakai, Soraku-gun; Masato Tokisige, Nara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,181

(22) Filed: Jun. 26, 1998

(30) Foreign Application Priority Data

Jul. 11, 1997 (JP) ............................... 9-186359

(51) Int. Cl.[7] ............................. G06K 15/02; G06F 3/12
(52) U.S. Cl. ..................................... 358/1.15; 358/1.13
(58) Field of Search ............................. 358/1.15, 1.16, 358/1.9, 1.13

(56) References Cited

U.S. PATENT DOCUMENTS 5,070,467 A * 12/1991 Todome ...................... 395/166
5,935,217 A * 8/1999 Sakai et al. .................. 709/249

FOREIGN PATENT DOCUMENTS

| JP | 4225392 A | 8/1992 | ............ G09G/5/00 |
| JP | 5205835 A | 8/1993 | ........... H01R/27/00 |
| JP | 6131140 A | 5/1994 | ............. G06F/3/14 |

* cited by examiner

*Primary Examiner*—Joseph Mancuso
*Assistant Examiner*—Douglas Tran

(57) ABSTRACT

In the digital image-forming apparatus of the present invention, when, for example, a liquid crystal video camera is connected thereto as an external input device, display data related to the shape of the operation section of the liquid crystal video camera is read based upon recognition data so that the operation section of the liquid crystal video camera is displayed on a display device placed on one part of the operation panel of the digital image-forming apparatus. In the operation section, a monitor and key switches are displayed in the same manner as the actual operation section of the liquid crystal video camera connected to the digital image-forming apparatus, and the liquid video camera connected thereto is operated through operations on the key switches, and images, recorded in the liquid crystal video camera, are displayed on the monitor. With this arrangement, the connected external input-output device can be visually recognized and confirmed, and operations related to function selection can be promptly carried out with ease.

14 Claims, 12 Drawing Sheets

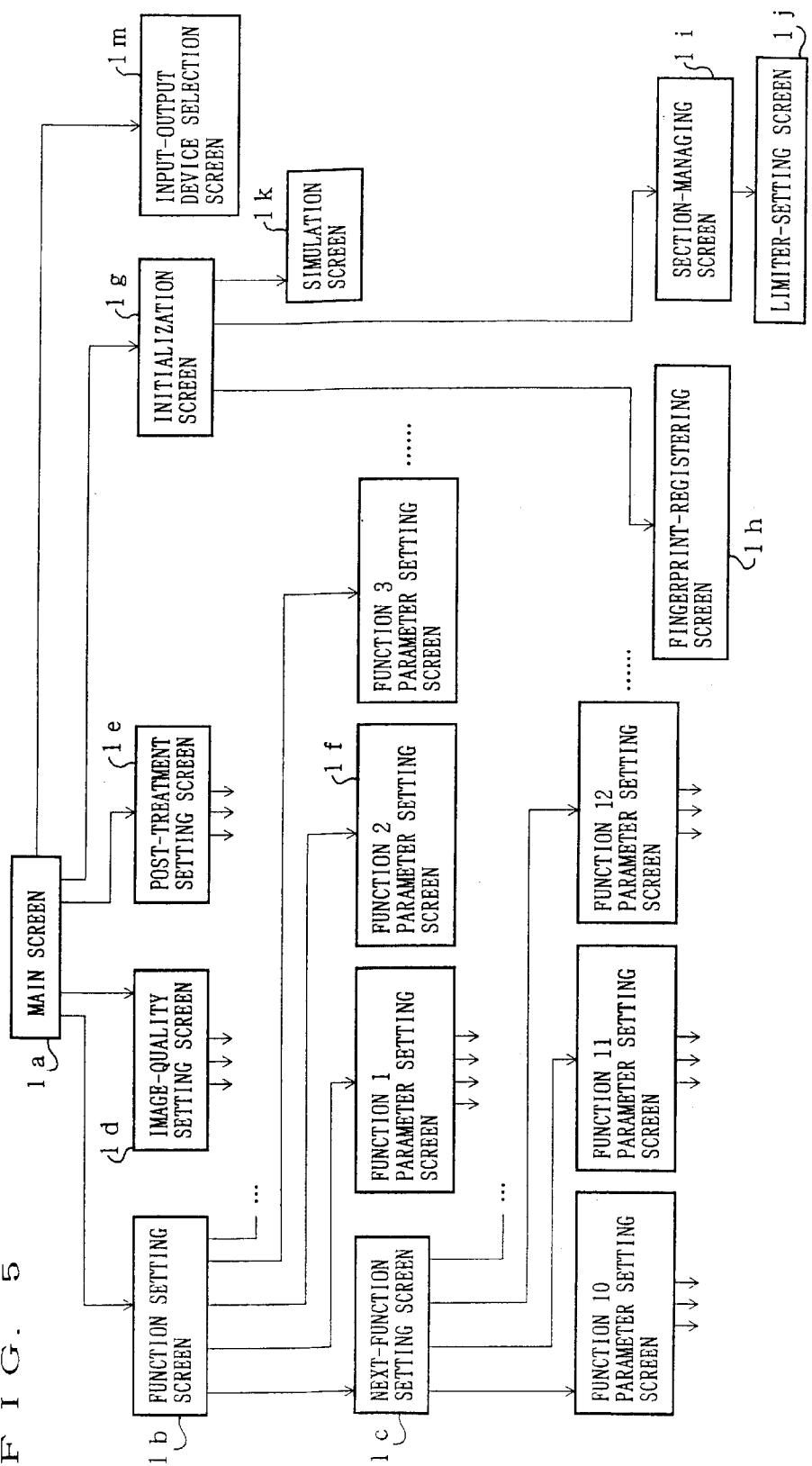
F I G. 5

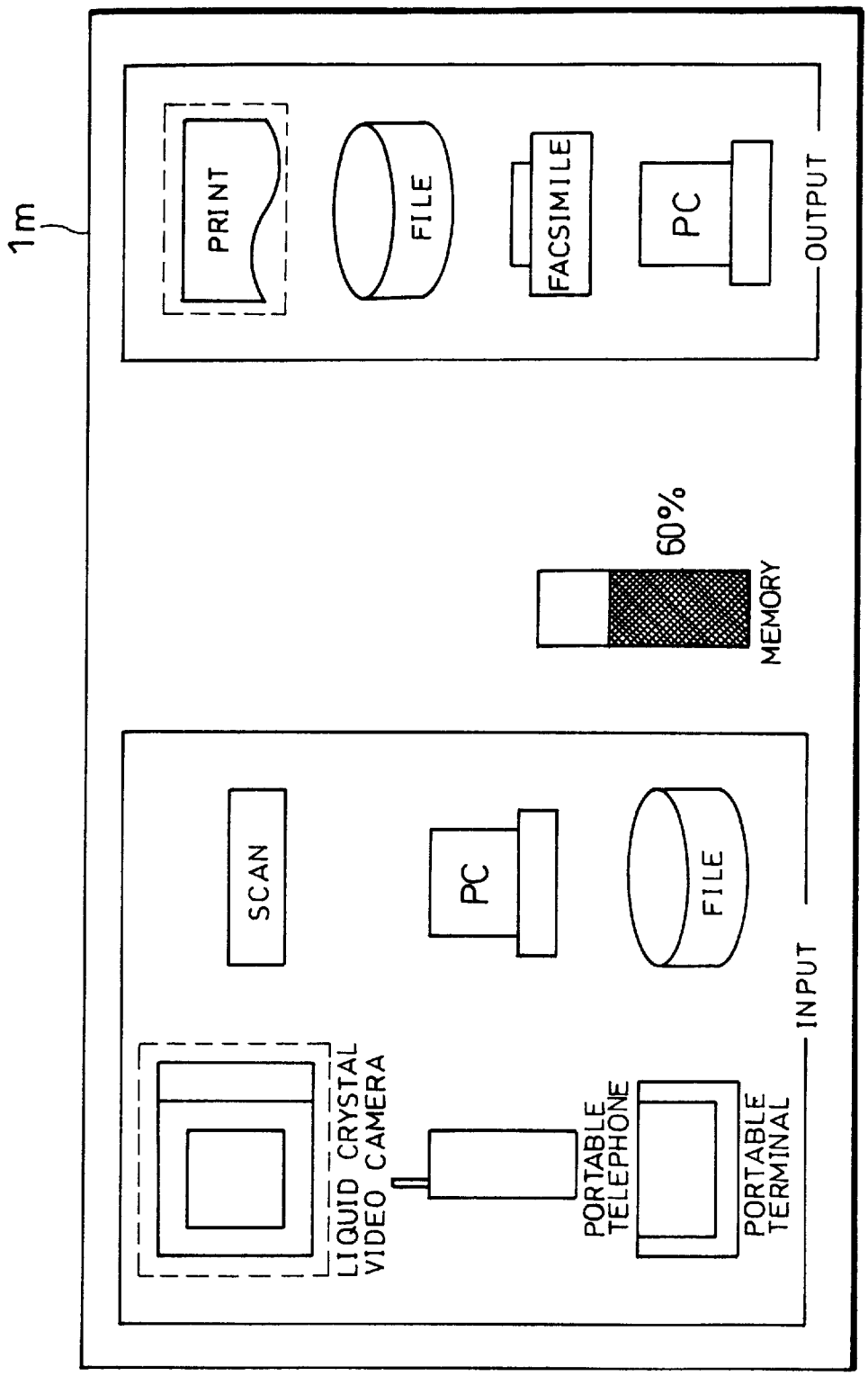

DIGITAL IMAGE-FORMING APPARATUS

FIELD OF THE INVENTION

The present invention relates to a digital image-forming apparatus for image-processing information inputted from a desired external input device through an interface section and for outputting the resulting data to a desired external output device through the above-mentioned interface section.

BACKGROUND OF THE INVENTION

There have been developed digital image-forming apparatuses functioning as a multi-function apparatus to which a plurality of external input-output devices are connected and which is provided with a plurality of converting functions. In such a multi-function apparatus, it is required to selectively input beforehand a function to be executed among the functions that are available. With respect to the function-selecting method of the multi-function apparatus, for example, Japanese Laid-Open Publication No. 131140/1994 (Tokukaihei 6-131140) discloses an arrangement in which: scan data of an original that is input data and image files in a hard disk (hereinafter, referred to as HD) are provided; in the case when a facsimile machine (hereinafter, referred to as FAX machine) is equipped, a plurality of input-instructing regions for indicating types of input and a plurality of output-instructing regions for indicating types of output are displayed on the display means; and based upon the combination of an instruction in the input-instructing region and an instruction in the output-instructing region, the function to be executed is selected.

However, the above-mentioned conventional digital image-forming apparatus has the following problems:

In the conventional digital image-forming apparatuses, external input-output devices that were assumed to be connected thereto were generally limited to built-in devices such as a FAX and a HD. Recently, however, there have been ever-increasing demands for connecting to the digital image-forming apparatus recently-developed and widely-used input-output devices, such as portable terminal devices, portable telephones, video cameras and digital still cameras, as well as a device capable of using recording media, such as IC cards, mini disks, SSFDCs (Solid State Floppy Disk Cards) and miniature cards. The attempt for connecting such external input-output devices to the digital image-forming apparatus raises a problem in which: a wide range of combinations of selectable functions are provided by the respective input-output devices, with the result that when these numerous functions are displayed as one lot on the display screen, the contents of operations related to selectable functions become too complicated to recognize. This trend has particularly increased in recent years when high functions of the external input-output devices have been achieved.

Moreover, in order to carry out an image-processing operation in the digital image-forming apparatus to which the external input-output devices are connected, it is necessary for the user to operate both the external input-output devices and the digital image-forming apparatus. Consequently, the user has to understand complicated functions of both the external input-output devices and the digital image-forming apparatus, which tends to cause a maloperation by the user.

Furthermore, when a hierarchical construction is given to the display screen related to selectable functions, the hierarchical construction becomes more multi-layered as the setting items increase, resulting in a problem in which the relationship before and after the setting-value input is not easily recognized.

SUMMARY OF THE INVENTION

The objective of the present invention is to provide a digital image-forming apparatus which allows the user to visually recognize and confirm external input-output devices connected thereto and also to promptly carry out operations related to selection on functions easily.

In order to achieve the above-mentioned objective, a digital image-forming apparatus of the present invention is provided with:

(1) an interface section to which a plurality of external input-output devices are connected;

(2) a storage section for storing a shape of an operation section for inputting an operation instruction of each of the external input devices connectable to the interface section, for each of the types of the devices;

(3) a display section for displaying a device-selection functional screen through which a device to be selected among the external input-output devices connected to the interface section is specified; and (4) a control section which reads the shape of the operation section of the selected external input-output device from the storage section, controls the display section so as to display the shape of the operation section, controls the selected external input device so as to carry out the specified operation instruction based upon the shape of the operation section that has been displayed, carries out an image-processing operation on information inputted from the external input device, and outputs the information that has been subjected to the image-processing operation to the selected external output device.

With the above-mentioned arrangement, information, inputted from the selected external input device, is image-processed by the digital image-forming apparatus through the interface section, and then outputted to the selected external output device in accordance with the following processes.

In the display section, the device-selection functional screen is provided. On the device-selection functional screen are displayed a plurality of external input-output devices that are connected to the interface section; and among these, those devices to be selected as an external input device and an external output device are specified. In this manner, the present invention allows the user to visually recognize and confirm the external input-output devices that are connected to the apparatus.

In the storage section, the shape of an operation section for inputting an operation instruction of each of the external input devices connectable to the interface section is stored for each of the types of the devices, and the shape of the operation section of the external input device selected through the device-selection functional screen is read from the storage section by the control section, and displayed on the above-mentioned display section.

In accordance with the shape of the operation section thus displayed, an operation instruction (in the case of an external input device selected, for example, operations such as rewind, fastforward and playback) is specified. Once the operation instruction has been specified, the selected external input device carries out the operation instruction accordingly. Thus, in the present invention, operations, which have been conventionally carried out on individual external input devices separately, can be promptly carried out easily on the digital image-forming apparatus in a centralized manner.

The specified operation is carried out in the selected external input device as described above, and after completion of the operation, the information, which has been subjected to the specified operation, is inputted to the digital image-forming apparatus from the external input device through the interface section. In the control section, after an image-processing operation, preliminarily set by the operator, has been carried out, the resulting information is outputted to the selected external output device through the interface section.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory drawing that shows a hierarchical construction of a display screen in a display device of the operation panel.

FIG. 8 is an explanatory drawing that shows one example of a selection screen for input-output devices on the display device.

DESCRIPTION OF THE EMBODIMENTS

The following description will discuss one embodiment of the present invention by exemplifying a case in which a digital copying machine (a digital image-forming apparatus) is adopted as a main apparatus of an image-forming system. In the present invention, the digital copying machine, which reads a document image electronically and which carries out an image-recording operation by processing and editing the image as image data, is connected to another digital image-processing apparatus through a data communication means so that an image-forming system is constituted.

Figure 1:
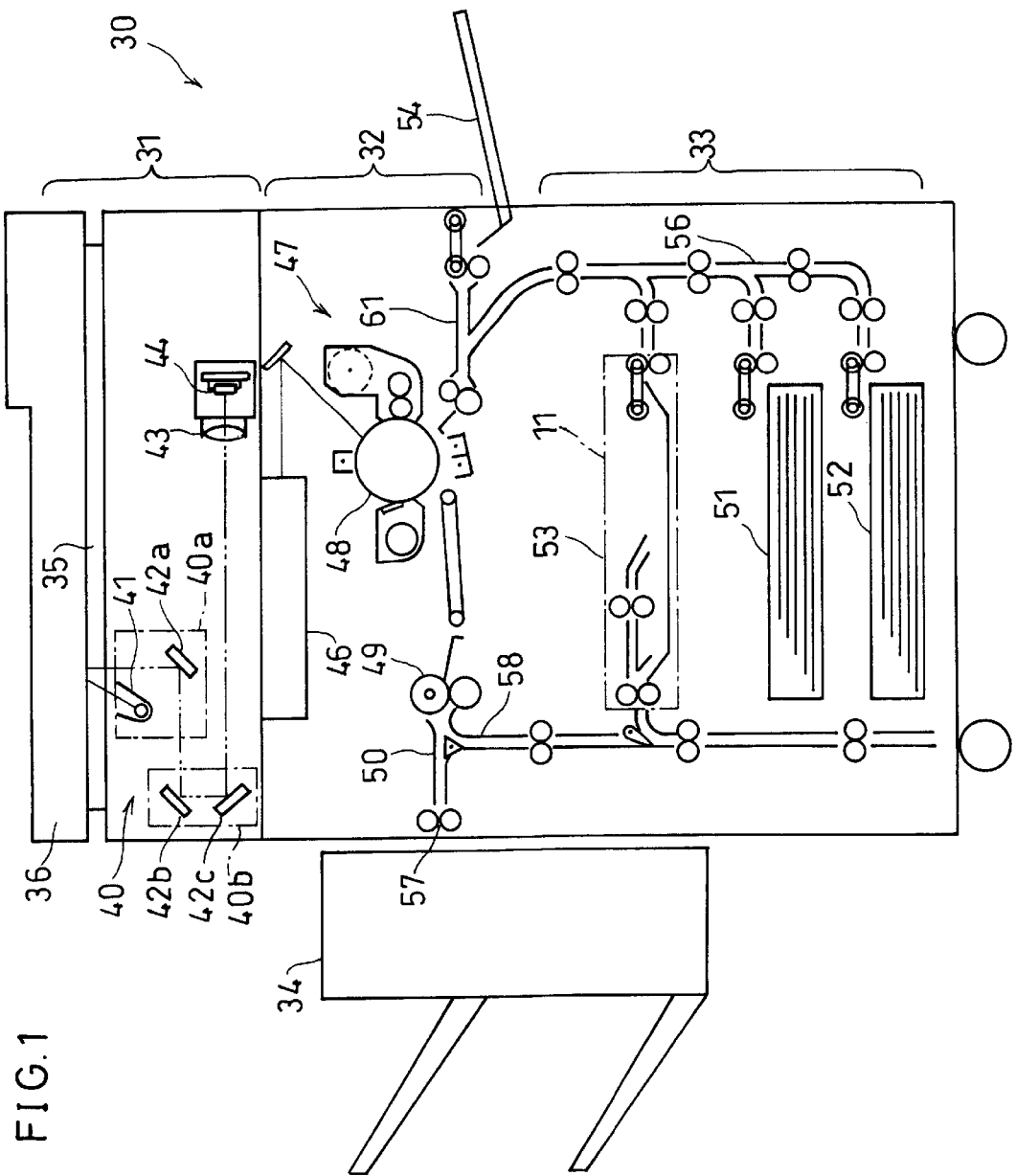
FIG. 1 is an explanatory drawing that shows a construction of a digital copying machine serving as a digital image-forming apparatus in accordance with an embodiment of the present invention.

FIG. 1 shows the construction of the digital copying machine constituting the image-forming system related to the embodiment of the present invention. The digital copying machine 30 has a scanner section 31 and a laser printer section 32, a multi-stage paper-feeding unit 33 and a sorter 34.

The scanner section 31 is constituted by a document platen 35 made of transparent glass, a recirculating automatic document feeder 36 (hereinafter, referred to as RADF) for automatically supplying and feeding documents onto the document platen 35 and a scanner unit 40 for scanning and reading an image of a document that has been placed on the document platen 35.

The scanner unit 40 is provided with a lamp reflector assembly 41 for illuminating the surface of a document image with light, a CCD 44 for receiving light reflected from the document and for converting it to an electrical image signal, mirrors 42a through 42c for directing the light reflected from the document to the CCD 44 and lenses 43 for converging the reflected light onto the CCD 44.

The first cassette 51 and the second cassette 52, each of which houses a plurality of sheets of paper of a single size, are attached to the multi-stage paper-feeding unit 33. The multi-stage paper-feeding unit 33 feeds sheets of paper one by one to the laser printer section 32 from either the first cassette 51 or the second cassette 52 in accordance with the selection by the operator.

The RADF 36 automatically feeds documents set on the document tray to the upper surface of the document platen 35 one by one. Further, the RADF 36 is provided with a transport path for one-sided document and a transport path for double-sided document so as to allow one side or two sides of the document to face the document platen 35 in accordance with the selection of the operator, and also provided with a switching means for selectively switching the transport paths.

The scanner section 31, arranged as described above, reads the image of documents that are successively placed on the document platen 35 through cooperative operations between the RADF 36 and the scanner unit 40. The image data, obtained by reading the document image, is supplied to an image-processing section which will be described later, and after having been subjected to various image processing operations, is temporarily stored in a memory in the image-processing section. The image data, stored in the memory, is supplied to the laser printer section 32 in accordance with an instruction for output.

The laser printer section 32 is provided with a manual paper-feed tray 54, a laser-writing unit 46 and an electro-photographic processing section 47. The laser-writing unit 46 has a semiconductor laser for releasing a laser light beam in accordance with the image data supplied from the memory of the image-processing section, a polygon mirror for polarizing the laser light beam with a constant angular velocity, and an f-θ lens for correcting the laser light beam that has been polarized with a constant angular velocity so that it is subjected to a constant-velocity polarization onto the photoconductor drum 48 in the electrophotographic processing section 47.

The electrophotographic processing section 47 rotatably supports the photoconductor drum 48 whose surface is made of a photoconductive material. On the periphery of the photoconductive drum 48 are provided devices, such as a charger, a developing device, a transfer device, a separating device, a cleaning device and a static eliminating device, and is also provided a fixing device 49. A diverging transport path 50 is placed on the downstream side of the fixing device 49 in the paper transport direction inside the digital copying machine 30. The diverging transport path 50 is branched to a paper-discharging transport path 57 connecting to the sorter 34 attached to the side face of the digital copying machine 30 and a multiple transport path 58 connecting to the multi-stage paper-feed unit 33.

The multi-stage paper-feed unit 33 is provided with a multiple paper-feed unit 11 and a common transport path 56, and the common transport path 56 is combined with a transport path 61 that runs from the manual paper-feed tray 54 to the electrophotographic processing section 47 so that paper, fed from the multiple paper-feed unit 11, the first paper-feed cassette 51 and the second paper-feed cassette 52, is directed to the electrophotographic processing section 47.

The electrophotographic processing section 47 has applied an mono-polar electric charge to the surface of the photoconductive drum 48 prior to the irradiation with the laser light beam by the laser-writing unit 46, and upon irradiation with the laser light beam, an electrostatic latent image is formed on the surface of the photoconductive drum 48. Developer is supplied to the electrostatic latent image so that the image is visualized as a developer image. Paper, which has been fed from the multi-stage paper-feed unit 33 or the manual paper-feed tray 54, is directed between the photoconductor drum 48 and the transfer device in synchronism with the rotation of the photoconductor drum 48 bearing the developer image so that the developer image is transferred onto the surface of the paper. The paper, on which the developer image has been transferred, is heated under pressure in the fixing device 49 so that the developer image is fused and fixed on the surface of the paper.

The paper, which has passed through the fixing device 49, is transported to the sorter 34 or the multiple paper-feed unit 11 from the diverging transport path 50 via the paper-discharge transport path 57 or the multiple transport path 58, in accordance with the selection made by the operator.

Figure 2:
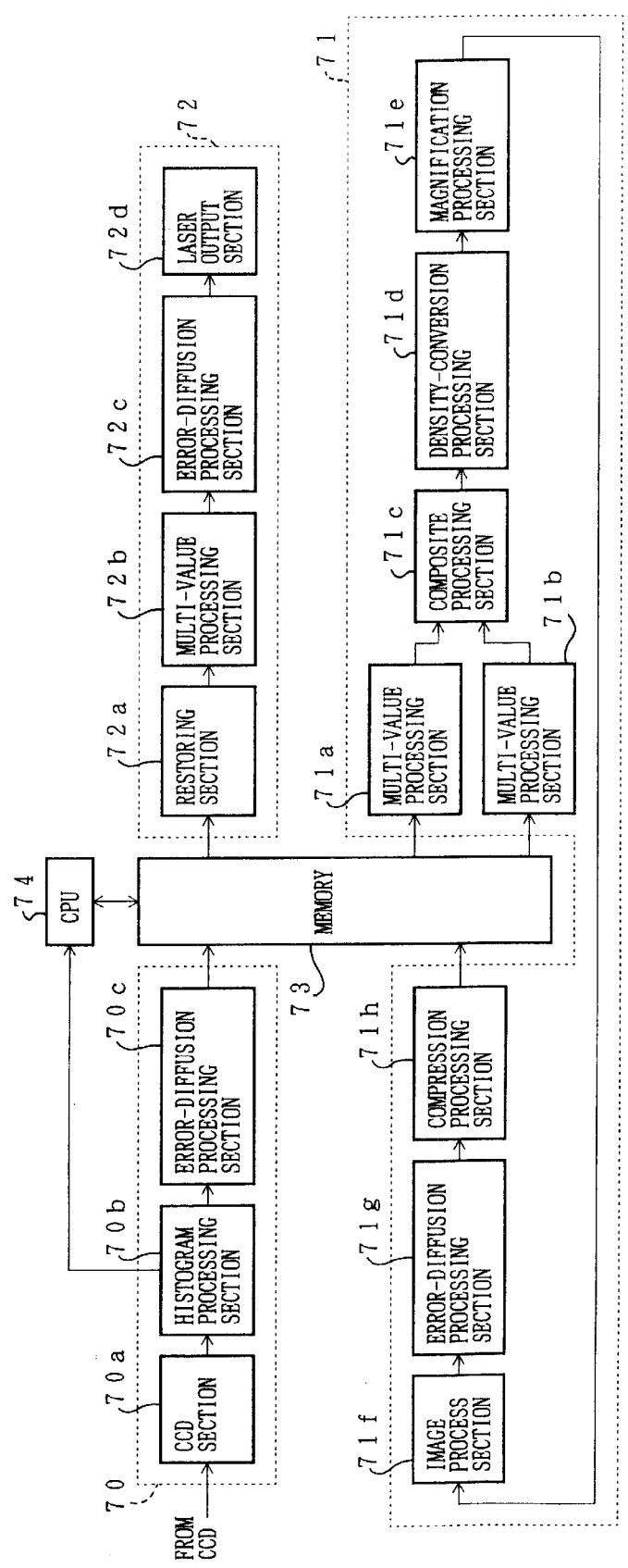
FIG. 2 is a block diagram that shows a construction of an image-processing section in the digital copying machine.

FIG. 2 is a block diagram showing the construction of an image-processing section installed in the digital copying machine. The image-processing section of the digital copying machine 30 is constituted by an image-data input section 70, an image-processing section 71, an image-data output section 72, a memory 73 and a CPU 74.

The image-data input section 70 has a CCD section 70a, a histogram processing section 70b and an error-diffusion processing section 70c. The image-data input section 70 is designed so that it converts image data of a document that has been read by the CCD 44 into binary coded data, and processes the image data by using the error-diffusion method while representing the data as binary digital quantity in the histogram, thereby temporarily storing the resulting data in the memory 73.

In the CCD section 70a, analog signals inputted from the CCD 44, which correspond to pixel densities of the image data, are analog-to-digital converted, and then subjected to an MTF correction and a black-and-white correction, or a gamma correction, and the resulting signals are released to the histogram processing section 70b as digital signals with 256 gray scales (8 bit).

In the histogram processing section 70b, the digital signals released from the CCD section 70a are added individually for the respective pixel densities of 256 gray scales; thus, density information (histogram data) is created. The resulting histogram data is sent to the error-diffusion processing section 70c as pixel data, and, if necessary, sent to the CPU 74.

In the error-diffusion processing section 70c, the pixel data, which is digital data of 8 bits/pixel released from the CCD section 70a, is converted into one bit (binary coded data) by the error-diffusion method which is one type of pseudo intermediate processing, that is, by the method for reflecting the error of binary coded digits to the binary coding decision between the adjacent pixels; thus, re-distributing operations for exactly reproducing the densities of local regions of a document are carried out, and the pixel data reflecting the results of the operations is stored in the memory 73.

The image-processing section 71 is provided with multi-value processing sections 71a and 71b, a composite processing section 71c, a density-conversion processing section 71d, a magnification processing section 71e, an image process section 71f, an error-diffusion processing section 71g and a compression-processing section 71h. The image-data processing section 71 finally converts the inputted image data into image date that is desired by the user, and the image data is stored in the memory 73 as output image data. Here, the various processing sections contained in the image-processing section 71 are selected to function, on demand.

In the multi-value processing sections 71a and 71b, the image data that has been binary coded by the error-diffusion processing section 70c in the image-data input section 70 is again converted into data with 256 gray scales.

In the composite processing section 71c, logical operations, that is, OR, AND or exclusive-OR operation, are selectively carried out for each pixel. The data used in this operation is pixel data stored in the memory 73 and bit data from a pattern generator.

In the density-conversion processing section 71d, the relationship of the output density to the input density is properly set with respect to the data signal with 256 gray scales based upon a predetermined gray-scale conversion table.

In the magnification processing section 71e, pixel data (density value) on a target pixel that is to be obtained after a specified change in magnification is found by carrying out an interpolating process based on the inputted known data in accordance with a specified magnification. The magnification processing section 71e carries out a variable magnification process in the sub-scanning direction of the document image, and then carries out a variable magnification process in the main scanning direction.

In the image process section 71f, various image processes are carried out on the inputted pixel data. Further, information extraction with respect to data rows, such as feature extraction, is carried out.

In the error-diffusion processing section 71g, the same process as that carried out in the error-diffusion processing section 70c in the image-data input section 70 is carried out.

In the compression processing section 71h, the binary data is compressed by a coding process that is referred to as "run length". Here, with respect to the compression of image data, the compression is operated in the last processing loop at the time when the final output image data has been complete.

The image-data output section 72 is provided with a restoring section 72a, a multi-value processing section 72b, an error-diffusion processing section 72c and a laser output section 72d. The image-data output section 72 restores the image data that has been stored in the memory 73 in a compressed state so as to again convert it to the original data with 256 gray scales, carries out an error diffusion process for quaternary data that provides smoother intermediate gray-scale expressions than binary data, and then transmits the resulting on/off data to the laser-writing unit 46.

In the restoring section 72*a*, the image data that has been compressed by the compression processing section 71*h* in the image-processing section 71 is restored. The multi-value processing section 72*b* carries out the same process as that carried out in the multi-value processing sections 71*a* and 71*b* in the image-data processing section 71. The error-diffusion processing section 72*c* carries out the same process as that carried out in the error-diffusion processing section 70*c* in the image-data input section 70.

In the laser output section 72*d*, the digital pixel data is converted to a laser on/off data in accordance with a control signal from a sequence controller which is not shown, and the resulting data is outputted to the laser-writing unit 46. Thus, the semiconductor laser in the laser-writing unit 46 is driven so that a laser light beam is directed from the semiconductor laser to the photoconductive drum 48 in accordance with the image.

Here, the data that is dealt in the image-data input section 70 and the image-data output section 72 is basically stored in the memory 73 as binary data so as to reduce the capacity of the memory 73; however, the data may be stored as quaternary data in order to avoid retrogradation of the image data. Further, the memory 73 may be constituted by a RAM, a hard disk, etc.

Figure 3:
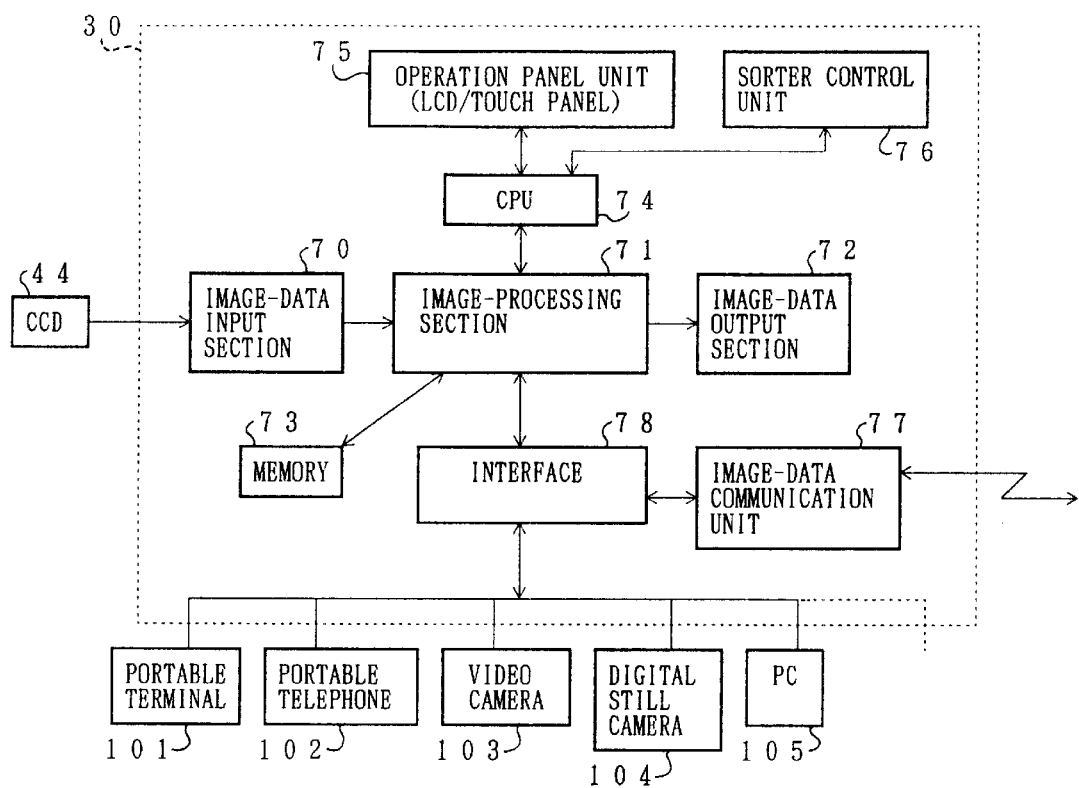
FIG. 3 is a block diagram that shows a construction of a control section in the digital copying machine.

FIG. 3 is a block diagram that shows the construction of the above-mentioned digital copying machine. The respective parts constituting the digital copying machine 30 are controlled in a centralized manner by a CPU 74 that controls the image-processing section shown in FIG. 2. In other words, the CPU74 manages the respective driving mechanisms constituting the digital copying machine 30, such as the RADF 36, the scanner section 31 and the laser printer section 32, through a sequential control, and also outputs control signals to the respective parts.

Moreover, an operation panel unit 75, which controls an operation panel having an LCD and a touch panel, is connected to the CPU 74. The operation panel unit 75 outputs a control signal to the CPU 74 in accordance with operation conditions given by the operator, for example, in accordance with a copying mode that is specified and set by the operator. Based upon the control signal thus inputted, the CPU 74 operates the corresponding part of the digital copying machine 30. The CPU 74 also outputs a control signal indicating the operating state of the digital copying machine 30 to the operation panel unit 75. Based upon the control signal thus inputted, the operation panel unit 75 displays the corresponding operating state of the digital copying machine 30 on the display section such as the LCD.

A sorter control unit 76 manages the operation of post-treatment devices such as the sorter 34 that carry out sorting and arranging processes on sheets of paper that have been discharged from the digital copying machine 30. An interface 78, which is constituted by any one of or some of RS232C, SCSI, IEEE1394, and USB, has external input-output devices, such as a portable terminal device 101, connected thereto. The CPU74 carries out input-output processes of image data to and from the external input-output devices connected to the interface 78. Further, an image-data communication unit 77 is connected to the interface 78. Through the image-data communication unit 77, the CPU 74 transmits and receives image information, image control signals, etc. to and from external input-output devices, such as a digital image device, other than those external input-output devices connected to the interface 78.

The CPU 74 calls for recognition data such as a model number from the external input-output device, such as a portable terminal device 101, connected to the interface 78, and stores recognition data read from the external input-output device. Further, the CPU74 preliminarily accepts registration of recognition data concerning the external input-output devices to and from which it transmits and receives image data through the image-data communication unit 77, and stores the recognition data.

Additionally, the recognition data concerning the external input-output devices may include country-name data indicating export country together with the model serial number so that with respect to an apparatus exported overseas, image data is translated into the language of the export country by utilizing the translation function of the digital copying machine 30 prior to the output operation.

Figure 4:
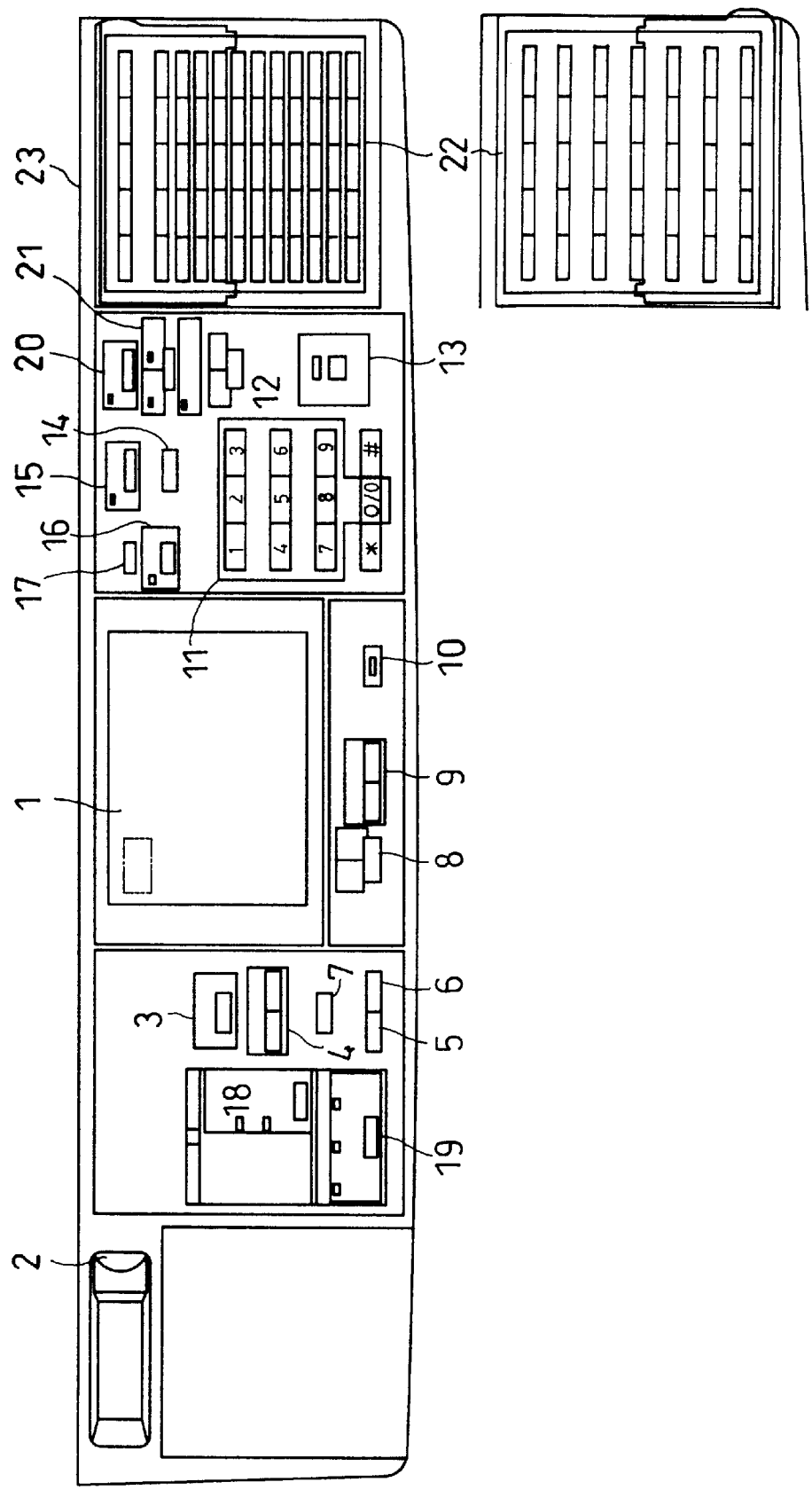
FIG. 4 is a plan view showing an operation panel of the copying machine.

FIG. 4 is a plan view that shows the operation panel of the above-mentioned copying machine. An operation panel 23 is installed on the top surface of the copying machine 30. A display device 1 is provided in the center of the operation panel 23. Below the display screen of the display device 1 are provided a density change-over key 8 for switching the copy density among the automatic setting mode, the manual setting mode and the photographic mode, a density adjustment key 9 for adjusting the density level during the manual mode or the photographic mode, and a paper-selection key 22 for selecting paper to be fed from sheets of paper placed on the paper-feed tray 54 or those housed in the paper-feed cassette 51 or the paper-feed cassette 52 attached to the paper-feed section 33.

On the left side of the display device 1, are placed an adjustment dial 2 for adjusting the brightness of the display screen of the display device 1, a magnification automatic-setting key 3 for choosing the automatic setting function of the copy magnification, a zoom key 4 for manually setting the copy magnification by each 1%, fixed magnification keys 5 and 6 for manually specifying any of a plurality of fixed copy magnifications, an original-size key 7 for manually specifying the original size that is the standard magnification, a double-side mode key 18 for specifying the double-side copy mode for copying an image on both sides of a sheet of paper, and an post-treatment-mode setting key 19 for specifying post-treatments such as sorting and stacking that are to be carried out on copied paper that has been discharged from the copying machine 30.

On the right side of the display device 1 are placed a number-of-copies setting key 11 for specifying the number of copies, a clear key 12 for clearing the number of copies and for instructing the stoppage of a continuing copying operation, a start key 13 for instructing the start of a copying operation, an all cancel key 14 for cancelling all the modes that have been set so as to return to the normal state, an interrupt key 15 for starting a copying operation for another document during a continuing copying operation for a document, an operation guide key 16 for allowing the display device 1 to display a guidance related to the operation method of the copying machine 30, a forward key 17 for instructing the page change of the guidance related to the operation method currently being displayed on the display device 1, and keys 20 through 22 related to facsimile modes.

These keys 20 through 22 related to facsimile modes include a memory transmission mode key 20 for allowing a transmitting document to be temporarily stored in the memory, and then to be transmitted, a mode change-over key 21 for switching operation modes of the copying machine 30 between the copying machine mode and the facsimile mode and a destination selection key 22 for calling for the facsimile number of the destination of a document to be transmitted that has been preliminarily stored.

Figure 6A:
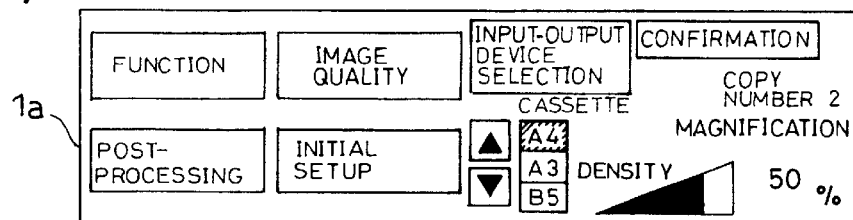
FIGS. 6(A) through 6(F) are explanatory drawings that show one example of the display screen in the display device.

The display device 1 is provided, for example, by installing a touch panel on the upper surface of an LCD. As illustrated in FIG. 5, the display screen on the display device 1 has a hierarchical structure. FIGS. 6 and 7 show specific structural examples of the respective display screens. In the display device 1 of the copying machine 30, a main screen 1a as shown in FIG. 6(A) is provided during the standard state. The main screen 1a has selection areas for providing any one of screens including a function setting screen, an image-quality setting screen, an post-treatment setting screen, an initialization screen, a set-function confirmation screen and an input-output device selection screen, and display areas indicating the selected states of the number of copies, the copy magnification, the image density and the paper-feed cassettes.

Figure 6B:
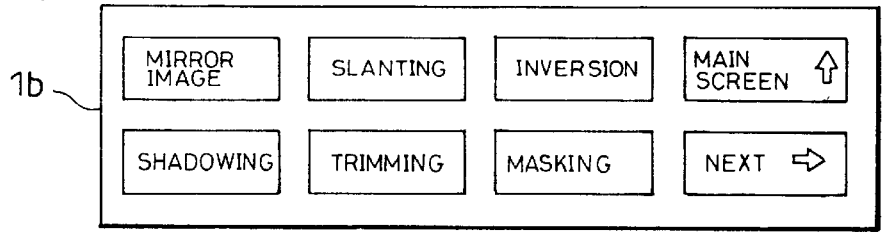
Figure 6C:
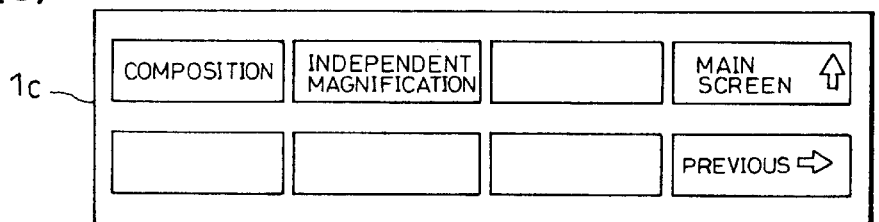
Figure 6D:
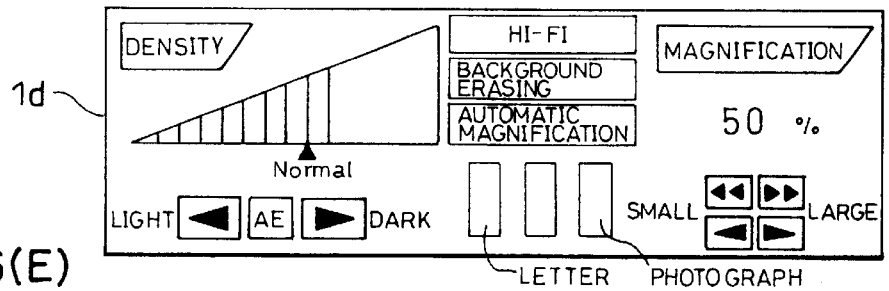

When any of the selection areas of the function setting screen is pressed in the main screen 1a, the display device 1 provides the first function setting screen 1b as shown in FIG. 6(B). In the first function setting screen 1b, the copying machine 30 accepts the setting of any of image-editing functions for the mirror image, slanted image, inverted image, shadowed image, trimmed image or masked image. The first function setting screen 1b includes selection areas for the main screen 1a and for the next page. When the selection area for the next page is pressed on the first function setting screen 1b, the display device 1 provides the second function setting screen 1c as shown in FIG. 6 (C). In the second function setting screen 1c, the copying machine 30 accepts the setting for image-editing functions such as composition and independent variable magnification.

When any of the selection areas of the image-quality setting screen is pressed in the main screen 1a, the display device 1 provides an image-quality setting screen 1d as shown in FIG. 6 (D). In the image-quality setting screen 1d, the copying machine 30 accepts the setting of data related to image quality such as the image density, copy magnification, etc.

Figure 6E:
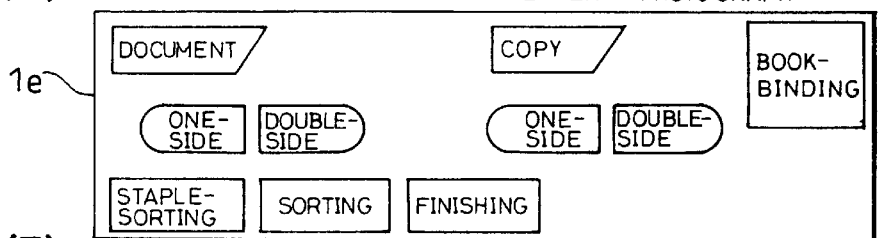

When any of the selection areas of the post-treatment setting screen is pressed in the main screen 1a, the display device 1 provides an post-treatment setting screen 1e as shown in FIG. 6(E). In the post-treatment setting screen 1e, the copying machine 30 accepts an instruction for switching to a lower-layer display screen, not shown, which allows selection for devices, such as the RADF 36, the multiple paper-feed unit 11 and the sorter 34, that are attached to the copying machine 30.

Figure 6F:
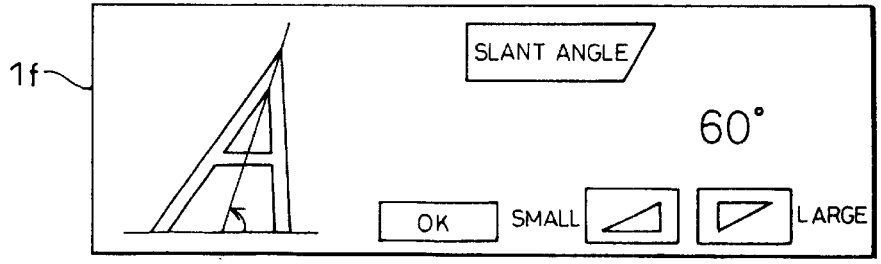

When the selection area for the slanted-image function is pressed in the first function setting screen 1b, the display device 1 provides a slanted-image setting screen if as shown in FIG. 6(F). The copying machine 30 accepts the setting of the slanting angle for a character in the slanted-image setting screen 1f.

Figure 7A:
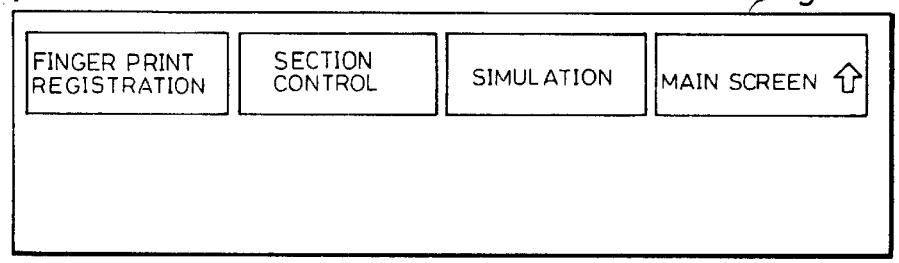
FIGS. 7(A) through 7(E) are explanatory drawings that show one example of the display screen in the display device.

When the selection area for the initialization screen is pressed in the main screen 1a, the display device 1 provides an initialization screen 1g as shown in FIG. 7(A). In the initialization screen 1g, the copying machine 30 accepts the selection of a fingerprint-registering function, a section-managing function and a simulation function.

Figure 7B:
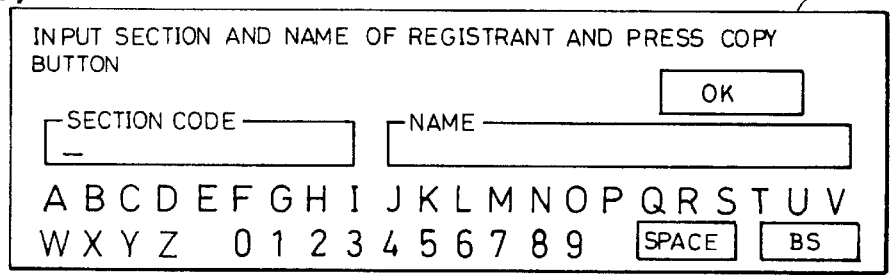

When the selection area for the fingerprint-registering function is pressed in the initialization screen 1g, the display device 1 provides a fingerprint-registering screen 1h as shown in FIG. 7(B). In the fingerprint-registering screen 1h, the copying machine 30 accepts inputs of a fingerprint that has been read, the section to which the corresponding person belongs, the name of the person, etc.

Figure 7C:
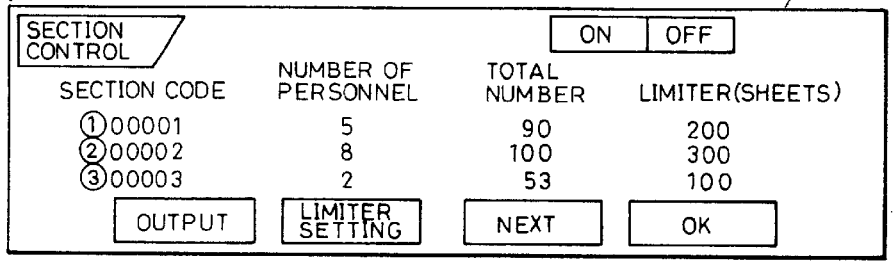

When the selection area for the section-managing function is pressed in the initialization screen 1g, the display device 1 provides a section-managing screen 1i as shown in FIG. 7(C). In the section-managing screen 1i, the copying machine 30 accepts the setting of section codes and the selection of limiter-setting functions.

Figure 7D:
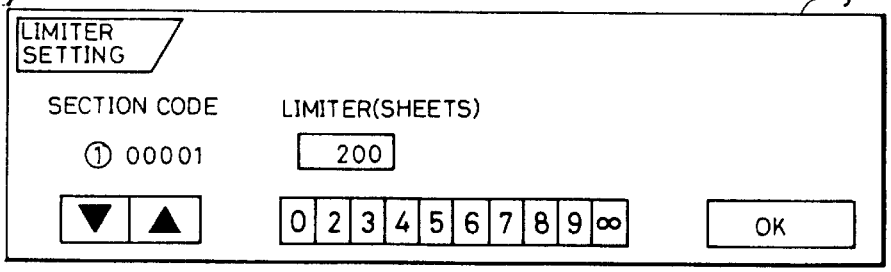

When the selection area for the limiter-setting functions is pressed in the section-managing screen 1i, the display device 1 provides a limiter-setting screen 1j as shown in FIG. 7(D). In the limiter-setting screen 1j, the copying machine 30 accepts the setting of the number of copies available for each section.

Figure 7E:
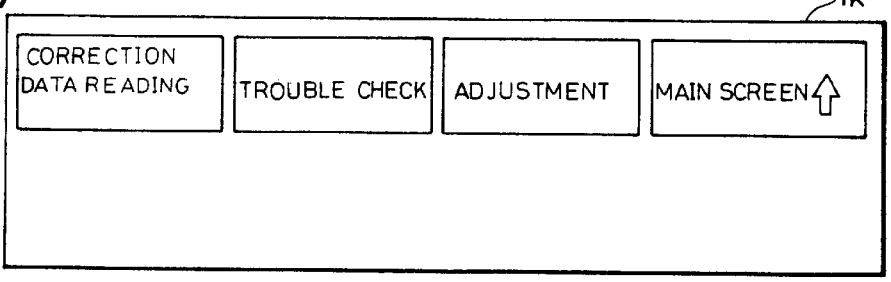

When the selection area for the simulation function is pressed in the initialization screen 1g, the display device 1 provides a simulation screen 1k as shown in FIG. 7(E). In the simulation screen 1k, the copying machine 30 accepts the setting of a read-out function for repair data, a trouble-shooting function and an adjusting function.

Here, the above-mentioned construction of the operation panel 23 and display screens of the display device 1 merely serve as one example, and keys to be placed on the operation panel 23 are modified based upon functions that are operable in the copying machine 30. For example, in the copying machine 30, the multiple paper-feed unit 11, the sorter 34 and the RADF 36 may be selectively adopted; and in the case where some or all of these devices are not attached to the copying machine 30, those keys related to the automatic double-side copying operation and the sorting operation of copying paper are not placed on the operation panel 23, and no selection areas for these devices are displayed on the display device 1.

FIG. 8 is a drawing that shows one example of an input-output device selection screen on the display device of the operation panel provided in the copying machine. When the selection area for the input-output device selection function is pressed on the main screen 1a provided on the display device 1 of the operation panel 23, the display device 1 provides an input-output device selection screen 1m as shown in FIG. 8. This input-output device selection screen 1m is designed as follows: Recognition data, which has been read from external input-output devices connected to the interface 78, and recognition data, which has been preliminarily set and inputted so as to define external input-output devices that would transmit and receive image data through the image-data communication unit 77, are read out from the memory, and device models, which are specified by the recognition data that have been read, are provided with respective selection areas classified as those on the input side and those on the output side (for example, displayed in the form of icons shown in the Figure). The device model is identified as follows: A search for the recognition data that has been read out from an external input-output device is carried out with respect to the memory in which the same recognition data is preliminarily stored. Then, in accordance with the search result, it is regarded as that the external input-output device corresponding to the recognition data thus searched is actually connected through the interface 78.

Figure 9:
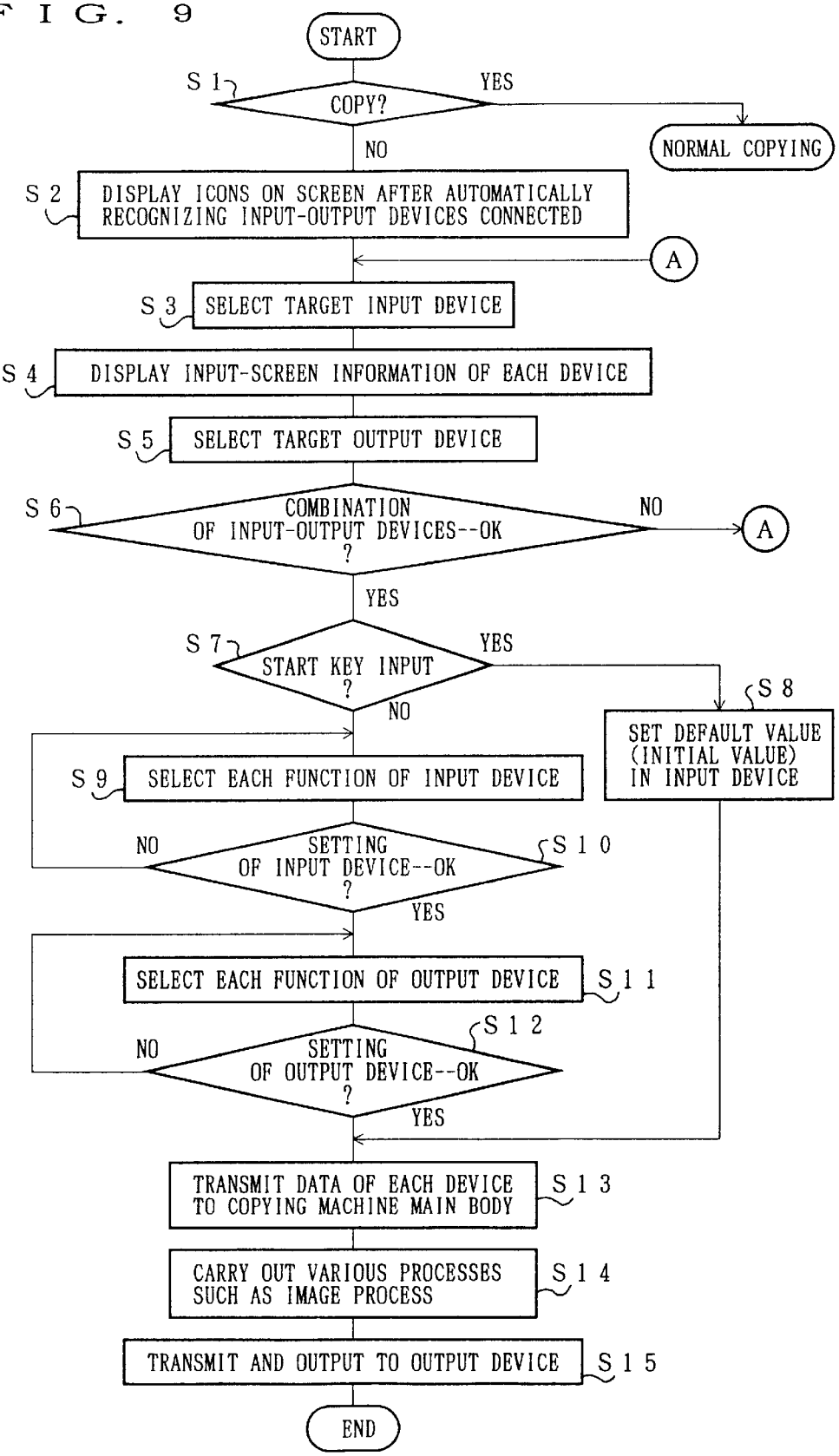
FIG. 9 is a flow chart that shows essential parts of a processing sequence carried out by a control section in the digital copying machine.

FIG. 9 is a flow chart that shows part of a sequence of processes carried out in the control section of the digital copying machine. The CPU 74, which constitutes the control section of the digital copying machine 30, provides the main screen 1a shown in FIG. 6(A) on the display device 1 during the stand-by state for the operator's action. When the selection area for the input-output device selection function is pressed on the main screen 1a, the CPU 74 recognizes the external input-output devices currently connected to the interface 78, and allows the display device 1 to provide the input-output device selection screen 1m shown in FIG. 8 (s1, s2). On the display device 1 showing the input-output device selection screen 1m, when the operator specifies any of the selection areas of the input devices (s3), the CPU 74 displays the input screen information (the shape of the operation section) of the selected input device on the display device 1 (s4).

Figure 10:
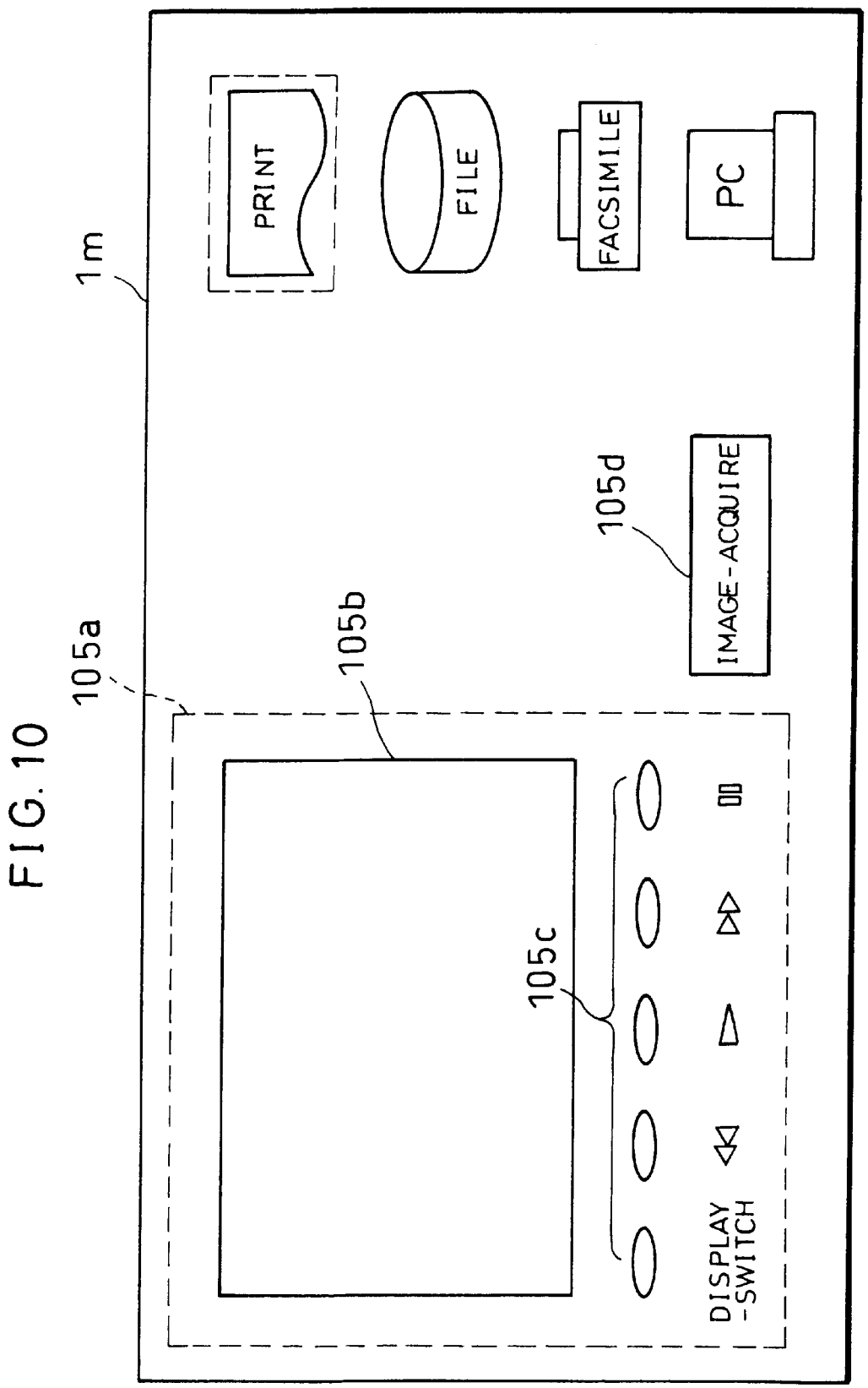
FIG. 10 is an explanatory drawing that shows one example of a screen used for receiving data setting with respect to an external input device in the display device.

With respect to the shape of the operation section, for example, when a liquid crystal video camera is selected on the input-output device selection screen 1m as the input device, the CPU 74 displays an operation section 105a of the liquid crystal video camera on the left side within the input-output device selection screen 1m, as illustrated in FIG. 10. The memory installed in the CPU 74 preliminarily stores the shapes of operation sections of external input-output devices that are connectable to the digital copying machine 30, for each of the device models. The CPU 74 reads the shape of the operation section of the external input-output device selected by the operator from the memory, and displays it on the display device 1. Here, the shape of the operation section of the external input-output device includes not only a physical shape, such as a monitor screen 105b and a key switch 105c provided in the external input-output device, but also expressions and words that are used for explaining the operation method, etc. of the external input-output device.

Next, when the operator selects an external output device on the right side of the input-output device selection screen 1m (s5), the CPU 74 discriminates whether or not the combination between the external input device and the external output device selected by the operator is operatively achieved (s6). The memory installed in the CPU 74 preliminarily stores combinations between external input devices and external output devices that would be operatively achieved among the external input-output devices that are connectable to the digital copying machine 30. For example, the input image data from the liquid video camera cannot be outputted to the facsimile due to the problem with resolution, etc; therefore, this combination is not achieved. The CPU 74 discriminates whether or not the combination selected by the operator fits to any of the combinations that have been preliminarily stored. In this case, the shape of the operation section of the selected external output device may be displayed on display device 1 together with the shape of the external input device, by using the same processes as those shown in s4 with respect to the external input device.

In the case when the combination between the external input-output devices selected by the operator is not operatively achieved, the CPU 74 displays a message for urging re-selection of the external output device. Here, the display device may be arranged so that, after an external input device has been selected, no selection can be made on those external output devices that are impossible to be combined with, by erasing displays of those external output devices that cannot be combined with the external input device. Moreover, selection of a plurality of external output devices may be accepted with respect to one external input device so that the same image data can be outputted to those external output devices. In other words, in the case when a plurality of external output devices are selected with respect to one external input device, the same image data may be outputted to a plurality of external output devices.

In this state, when the start key 13 is operated, the CPU 74 allows the external input device and the external output device to carry out input and output operations respectively based upon the initial values (s8). When the operator carries out any setting operation on the functions of the external input device and the external output device (when the contents of the operation are specified) (s9, s11), the CPU 74 makes a judgement as to whether or not the contents of the setting are appropriate (s10, s12), and carries out the input of image data, the image processing, and the output of the image data in accordance with the contents of the setting (s13 through s15).

For example, when the operator operates any of the key switches 105c, "rewind", "playback", "fastforward" and "stop", on the input-output device selection screen 1m provided on the display device 1 in a state as shown in FIG. 10, the CPU 74 outputs a control data corresponding to the operation instruction to the liquid crystal video camera through the interface 78. Consequently, the liquid crystal video camera is operated in accordance of the operation instruction of the key switch 105c in the digital copying machine 30, and image data, recorded in the liquid crystal video camera, is inputted to the digital copying machine 30 in accordance with the operation instruction of the key switch 105c. The CPU 74 displays the image data inputted from the liquid crystal video camera on the monitor 105b displayed within the input-output device selection screen 1m of the display device 1. Such input and output operations of the control data and the motion image can be achieved by adopting a high-speed communication interface such as the IEEE 1394 or the USB as the interface 78.

Additionally, when the operator selects the liquid crystal video camera as the external input device as described above, the operator selects through the operation of the key switch 105c a piece of image data to be inputted to the digital copying machine 30 from image data recorded in the liquid crystal video camera, and then presses the area of an image-acquiring key 105d within the input-output device selection screen 1m shown in FIG. 10. When the image-acquiring key 105d is pressed, the CPU 74 reads the image displayed on the monitor 105b within the input-output device selection screen 1m as the image data that is to be outputted to the external output device.

Through the processes as described above, the CPU 74, which constitutes the control section of the digital copying machine 30, accepts the selection of the external input-output devices on the display device 1, displays the shapes of the operation sections of the selected external input-output devices on the display device 1, reads image data from the external input device in accordance with the operation instruction of the operation section of the external input-output devices displayed on the display device 1, and carries out an image-processing on the image data that has been read, thereby outputting the resulting data to the external output device.

Therefore, the operator can operate the external input-output devices on the display device 1 of the digital copying machine 30 through the same operations as those actually carried out on the operation sections of the external input-output devices. Thus, it becomes possible to easily carry out the input-output processes on image data between the digital copying machine 30 and the external input-output devices; that is, for example, image data being recorded by the liquid crystal video camera can be copied by the digital copying machine 30, or can be transmitted to a facsimile machine through the digital copying machine 30 more easily.

Figure 11:
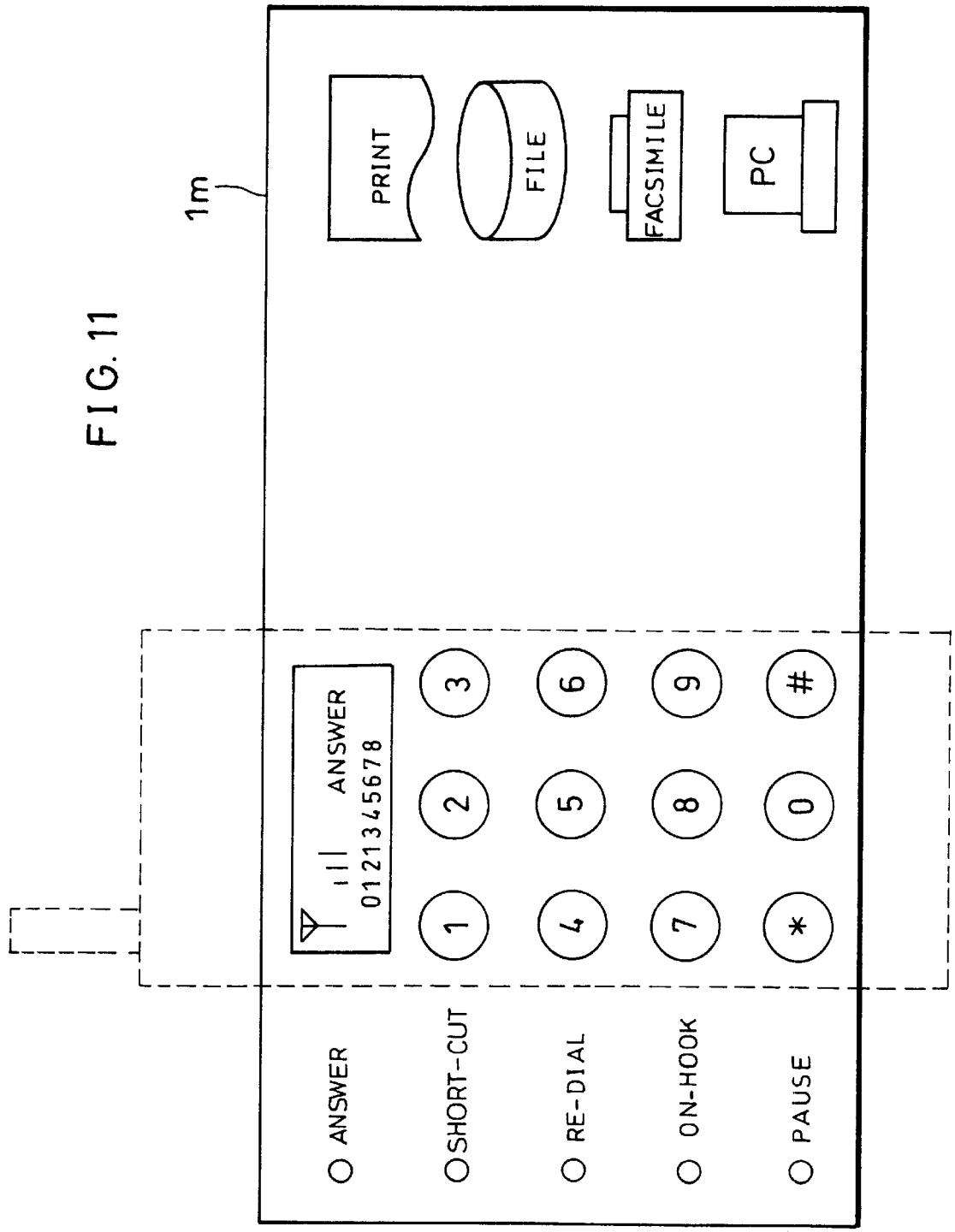
FIG. 11 is an explanatory drawing that shows another example of the screen used for receiving data setting with respect to an external input device in the display device.

In the case when the operator selects a portable telephone as the external input device, the CPU 74, as illustrated in FIG. 11, displays the shape of the operation section of the portable telephone on the input device selection screen 1m displayed on the display device 1, and also retrieves personal information corresponding to validation data such as telephone numbers, etc. that are originally possessed by the portable phone connected to the digital copying machine 30, while considering the relation between the personal data and validation data that have been preliminarily stored in the memory. If the personal information corresponding to the validation data of the portable telephone coincides with any personal information whose address is contained in confidential image data that has been inputted from another external input device to the digital copying machine 30, or received by the digital copying machine 30 from an external facsimile machine and that has been preliminarily stored in the memory, the CPU 74 outputs the corresponding image data. With this arrangement, the operator allows the digital copying machine 30 to make a judgement as to whether or not the image data should be outputted by using his or her portable telephone as the means for validation.

Moreover, the apparatus may be designed as follows: the CPU 74 stores the contents of setting made in the processes from s9 to s12 in FIG. 9 for each device model of the external input-output devices, and when any external input-output device of the same device model is connected to the digital copying machine 30 next time, the contents of the setting are read by using an input of image data as a trigger so that an automatic setting can be made.

Figure 12:
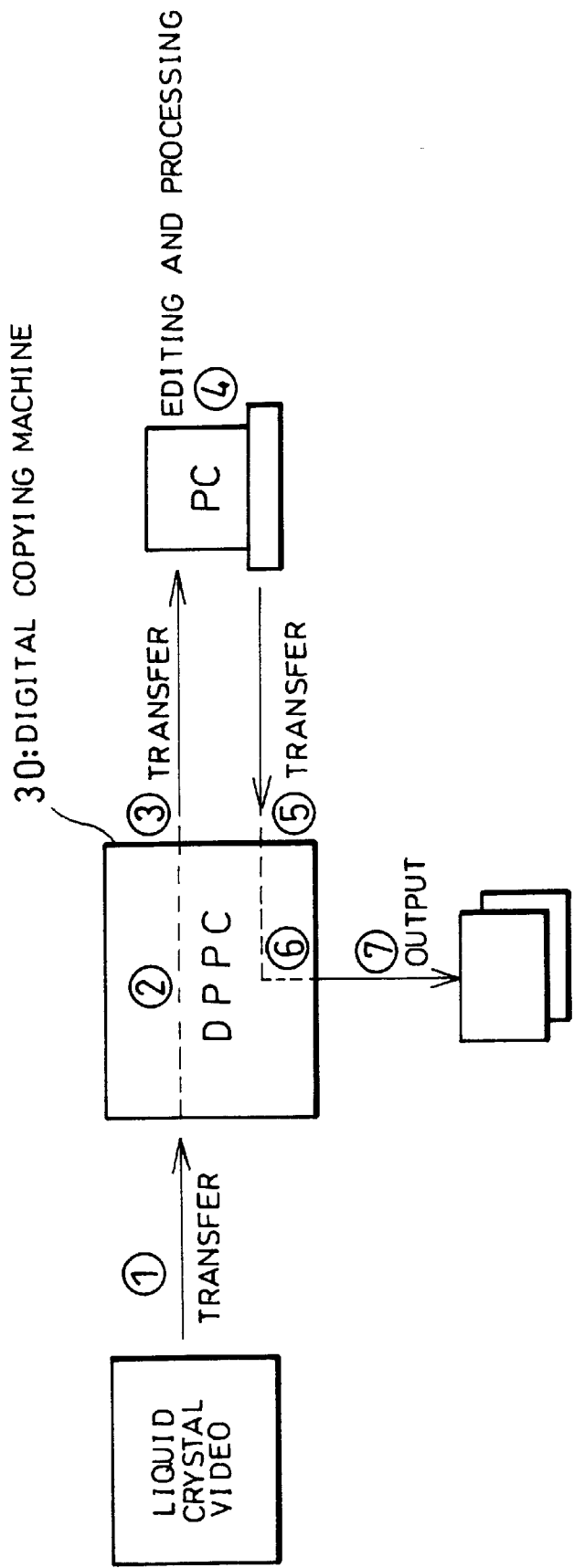
FIG. 12 is an explanatory drawing that shows one example of a construction of an image-forming system that is constituted by using the digital image-forming apparatus of the present invention.

For example, in a digital copying machine 30 to which a liquid crystal video camera and a personal computer are connected as illustrated in FIG. 12, when "n" pieces of image data recorded in the liquid crystal video camera are composed into a single image and when the digital copying machine 30 carries out an image-forming process on this image based on the size and the number of sheets of paper that have been set by the personal computer, specifications on the number and arrangement of the pieces of image data that are set on the display screen of the operation section of the liquid crystal video camera and setting data, such as the paper size and the number of copies, that is set on the display screen of the operation section of the personal computer are collectively registered in the memory with a predetermined program number, etc. attached thereto together with recognition data of the liquid crystal video camera and the personal computer.

Next, when it is judged from the recognition data having been read that a liquid crystal video camera and a personal computer of the same device models are connected to the copying machine 30, or when the program number is inputted from the operation panel 23 of the digital copying machine 30 or the external input-output device such as the personal computer, the CPU 74 reads the setting data registered in the memory, and carries out a copying operation based upon the contents of the setting data that have been read. This arrangement makes it easier to carry out input operations of setting data even on complicated image processing.

Furthermore, the apparatus may be designed as follows: the display device 1 is allowed to display the operation section of any external input-output device that is not actually connected to the interface 78, and setting inputs for control data are preliminarily made in a virtual manner through the operation of the operation section displayed on display device 1, and stored in the memory. When the external input-output device is actually connected to the interface 78, the contents of the setting for control data are read from the memory, and the corresponding image processing is carried out.

In addition, with respect to the judgement made at s12 as to whether or not the contents of setting are appropriate, the CPU 74 may be arranged so that it calls for the judgement of the external input-output apparatus as to whether or not the contents of the setting are acceptable. For example, in the case when a personal computer is selected as the external output device, the CPU 74 may call for the judgement of the personal computer as to whether or not the capacity of its memory is sufficient in storing image data to be outputted from the digital copying machine 30.

As described above, the first digital image-forming apparatus of the present invention is provided with: an interface section to which external input-output devices are connected; a display section for displaying display data; a storage section that stores the relationship between recognition data for each device model of external input-output devices that are connectable to the interface and display data of the display section related to input operations of control data of the external input-output devices; and a control section that reads recognition data for identifying the device model from an external input-output device connected to the interface section, retrieves the storage section for the recognition data read from the external input-output device, allows the display section to display the display data of the corresponding external input-output device, accepts input operations for the control data of the external input-output device at the display section, and carries out processing of image data that is inputted or outputted to or from the external input-output device based upon the control data inputted thereto.

In the above-mentioned invention, the display section of the digital image-forming apparatus accepts input operations for control data related to an external input-output device which transmits or receives image data to or from the digital image-forming apparatus. Therefore, the input operations related to processing of image data that is transmitted or received to or from the external input-output device are carried out merely through operations in the digital image-forming apparatus.

Moreover, since the connecting state of the external input-output device is automatically recognized, it is not necessary to manually input the connecting state of the external input-output device, the input operations related to processing of image data that is transmitted or received to or from the external input-output device are carried out merely through operations in the digital image-forming apparatus, the external input-output device that has been connected can be visually recognized and confirmed, and operations related to function selection can be promptly carried out with ease.

The above-mentioned display data is preferably given as data for displaying the operation section of the external input-output device on the display section.

In this case, the input operation for control data of the external input-output device is carried out very easily through operations on the operation section of the external input-output device displayed on the display section of the digital image-forming apparatus.

It is preferable to arrange the control section so that it allows the display section to display an output image of the external input-output device that is given based upon the input operation for control data on the display section.

In this case, the output image of the external input-output device that is given based upon the input operation on the display section is displayed on the display section of the digital image-forming apparatus. Therefore, the output image of the external input-output device can be confirmed on the display section of the digital image-forming apparatus.

Moreover, since the output image of the external input-output device is confirmed on the display section of the digital image-forming apparatus, it becomes possible to easily select image data that is to be inputted to the digital image-forming apparatus.

The control section is preferably arranged so that the contents of the input operation on the display section for control data related to the external input-output apparatus and the contents of the image-forming process for image data that is transmitted and received to and from the external input-output device is collectively stored in the storage section and an selective input can be made on processes that are carried out based on the contents of the input operation and the contents of the image-forming process.

In this case, with respect to processes frequently used, the setting operations concerning the contents of the input operation and the contents of the image-forming process can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image-forming apparatus comprising:

an interface section to which a plurality of external input-output devices are connected;

a storage section for storing a shape of an operation section for inputting an operation instruction of each of the external input devices connectable to the interface section, for each of the models of the devices;

a display section for displaying a device-selection functional screen through which a device to be selected among the external input-output devices connected to the interface section is specified; and a control section which reads the shape of the operation section of the selected external input-output device from the storage section, controls the display section so as to display the shape of the operation section, controls the selected external input device so as to carry out the specified operation instruction based upon the shape of the operation section that has been displayed, carries out an image-processing operation on information which is displayed on the display section after being inputted from the external input device, and outputs the information that has been subjected to the image-processing operation to the selected external output device;

wherein the external input-output device has the operation section.

2. The digital image-forming apparatus as defined in claim 1, wherein the control section calls for recognition data for identifying device model from the external input-output device connected to the interface section, stores the recognition data read from the external input-output apparatus in the storage section, with the storage section being preliminarily provided with recognition data for identifying device models of external input-output devices that are connectable to the interface section, retrieves the recognition data preliminarily stored in the storage section for data identical to the recognition data that has been read, reads a shape of an operation section of an external input-output device corresponding to the recognition data from the storage section, and allows the shape thereof to be displayed on the display section.

3. The digital image-forming apparatus as defined in claim 1, wherein: the storage section stores a shape of an operation section for inputting the contents of operation for an external output device that is connectable to the interface section for each device model thereof, the display section displays the shape of the operation section of the external output device, and the control section reads the shape of the operation section of the selected external output device from the storage section, allows the display section to display the shape thereof, controls the selected external output device so as to carry out the specified operations of the external input-output device, carries out an image processing on information that has been inputted from the selected external input device, and outputs the information that has been subjected to the image processing to the selected external output device.

4. The digital image-forming apparatus as defined in claim 1, wherein: the storage section preliminarily stores combinations of external input devices and external output devices that are operatively achieved among the external input-output devices, and the control section discriminates whether or not the specified combination of the external input-output devices is operatively achieved based on the combinations that have been preliminarily stored in the storage section.

5. The digital image-forming apparatus as defined in claim 4, wherein, if the discrimination shows that the combination is not operatively achieved, the control section controls the display section so as to display a message calling for re-selection of a new combination of external input-output devices.

6. The digital image-forming apparatus as defined in claim 4, wherein, upon selection of an external input device, the control section controls a display of the display section so as to prevent external output devices that are not combined with the external input device from being selected.

7. The digital image-forming apparatus as defined in claim 4, wherein, upon selection of an external input device, the control section erases displays of external output devices that are not combined with the external input device from the display section.

8. The digital image-forming apparatus as defined in claim 1, wherein, upon selection of a plurality of external output devices through the display section, the control section allows the same information to be outputted from the selected external input device to said plurality of external output devices.

9. The digital image-forming apparatus as defined in claim 1, wherein said storage section preliminarily stores recognition data specific to the external input devices in correspondence with personal information, and in outputting information that has been subjected to the image-processing operation to the selected external output device, said control section judges whether outputting said information is allowed or not, by comparing personal information included in said information with the recognition data of a connected external input device.

10. A digital image-forming apparatus comprising:

an interface section to which external input-output devices are connected;

a display section for displaying display data;

a storage section that stores the relationship between recognition data for each device model of external input-output devices that are connectable to the interface and display data of the display section related to input operations of control data of the external input-output devices; and a control section that reads recognition data for identifying the device model from an external input-output device connected to the interface section, retrieves the storage section for the recognition data read from the external input-output device, allows the display section to display an output image from the external input-output device based upon the input operation on the display section, and carries out image processing on image data that is displayed on the display section; and wherein the external input-output device has an operation section, and the display data is given as data for displaying the operation section of the external input output device on the display section.

11. The digital image-forming apparatus as defined in claim 10, wherein the control section allows the storage section to store the contents of the input operation on the display section for control data related to the external input-output apparatus and the contents of the image-forming process for image data that is transmitted and received to and from the external input-output device, and when the external input-output device is connected, carries out a controlling operation based on the contents of the input operation and the contents of the image-forming process.

12. The digital image-forming apparatus as defined in claim 10, wherein said storage section preliminary stores recognition data specific to external input devices in correspondence with personal information, and in outputting information that has been subjected to the image processing to a selected external output device, said control section judges whether outputting said information is allowed or not, by comparing personal information included in said information with the recognition data of a connected external input device.

13. A digital image-forming apparatus comprising:

an interface section to which a plurality of external input-output devices are connected;

a storage section for storing a shape of an operation section for inputting an operation instruction of each of the external input devices connectable to the interface section, for each of the models of the devices;

a display section for displaying a device-selection functional screen through which a device to be selected among the external input-output devices connected to the interface section is specified; and a control section which reads the shape of the operation section of the selected external input-output device from the storage section, controls the display section so as to display the shape of the operation section, controls the selected external input device so as to carry out the specified operation instruction based upon the shape of the operation section that has been displayed, carries out an image-processing operation on information inputted form the external input device, and outputs the information that has been subjected to the image-processing operation to the selected external output device, said operation section displayed on said display section being reproduced so as to have an alignment identical to the operation section of the external input-output device.

14. A digital image-forming apparatus comprising:

an interface section to which external input-output devices are connected;

a display section for displaying display data;

a storage section that stores the relationship between recognition data for each device model of external input-output devices that are connectable to the interface and display data of the display section related to input operations of control data of the external input-output devices; and a control section that reads recognition data for identifying the device model from an external input-output device connected to the interface section, retrieves the storage section for the recognition data read from the external input-output device, allows the display section to display the display data of the corresponding external input-output device, accepts input operations for the control data of the external input-output device at the display section, and carries out processing of image data that is inputted or outputted to or from the external input-output device based upon the control data inputted thereto, said display data being given as data for displaying the operation section of the external input-output device on the display section, said operation section displayed on said display section being reproduced so as to have an alignment identical to the operation section of the external input-output device.

* * * * *